(12) United States Patent
Ohe et al.

(10) Patent No.: US 6,300,994 B1
(45) Date of Patent: Oct. 9, 2001

(54) LIQUID CRYSTAL DISPLAY DEVICE WITH SUBSTANTIAL ELIMINATION OF RESIDUAL IMAGE

(75) Inventors: Masahito Ohe, Hitachi; Katsumi Kondo, Katsuta, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/336,689

(22) Filed: Jun. 21, 1999

Related U.S. Application Data

(63) Continuation of application No. 08/770,728, filed on Dec. 19, 1996, now Pat. No. 5,914,761, which is a continuation of application No. 08/308,157, filed on Sep. 19, 1994, now Pat. No. 5,600,464.

(30) Foreign Application Priority Data

Sep. 20, 1993 (JP) ................................. 5-233262
Oct. 12, 1993 (JP) ................................. 5-254028

(51) Int. Cl.[7] .................................... G02F 1/1345
(52) U.S. Cl. .................................... 349/141; 349/138
(58) Field of Search .................... 349/141, 138

(56) References Cited

U.S. PATENT DOCUMENTS

| | | |
|---|---|---|
| 3,772,874 | 11/1973 | Lefkowitz . |
| 3,807,831 | 4/1974 | Soref . |
| 3,981,559 | 9/1976 | Channin . |
| 4,333,708 | 6/1982 | Boyd et al. . |
| 4,345,249 | 8/1982 | Togashi . |
| 4,405,208 | * 9/1983 | Shirai ................................. 349/132 |
| 4,929,060 | 5/1990 | Sugimoto et al. . |
| 5,126,867 | 6/1992 | Ishiwata . |
| 5,841,498 | * 11/1998 | Baur et al. ........................... 349/141 |

FOREIGN PATENT DOCUMENTS

| | | |
|---|---|---|
| 0 420 340 | 4/1991 | (EP) . |
| 52-41543 | 3/1977 | (JP) . |
| 54-43759 | 4/1979 | (JP) . |
| 57-618 | 1/1982 | (JP) . |

* cited by examiner

Primary Examiner—Kenneth Parker
(74) Attorney, Agent, or Firm—Antonelli, Terry, Stout & Kraus, LLP

(57) ABSTRACT

A liquid crystal display device having a plurality of switching elements including a pair of substrates, a liquid crystal layer interposed between the pair of substrates, and an electrode structure formed on one of the pair of substrates for generating an electric field having a component substantially in parallel with the one of said pair of substrates. The electrode structure includes at least one common electrode and at least one pixel electrode. An organic film is formed on at least one of the at least one common electrode and the at least one pixel electrode, with the organic film being both an insulating film and an orientation film.

5 Claims, 10 Drawing Sheets

FIG. 4(a)
FIG. 4(c)
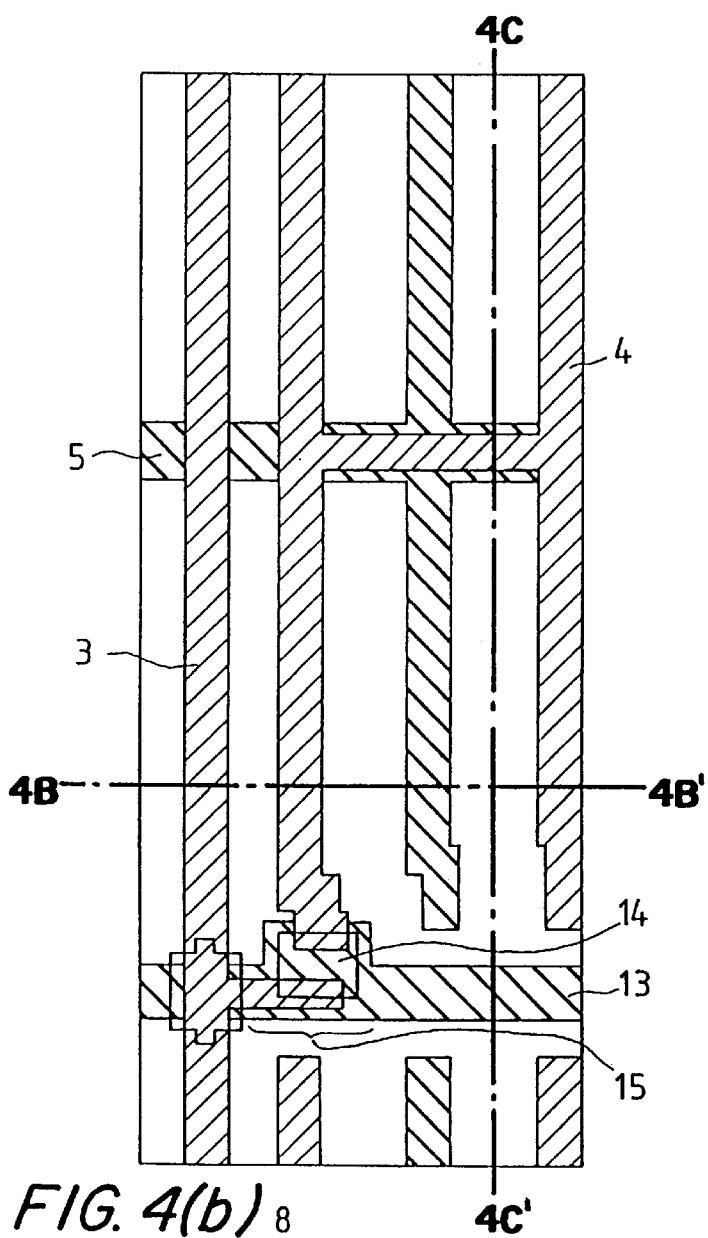
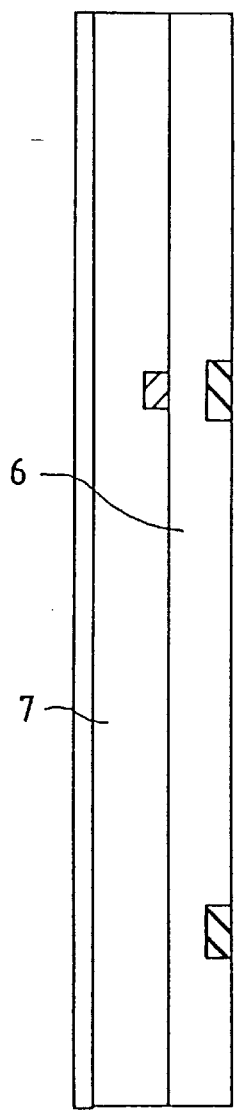
FIG. 4(b)
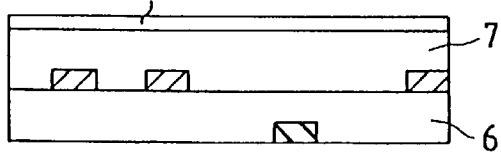

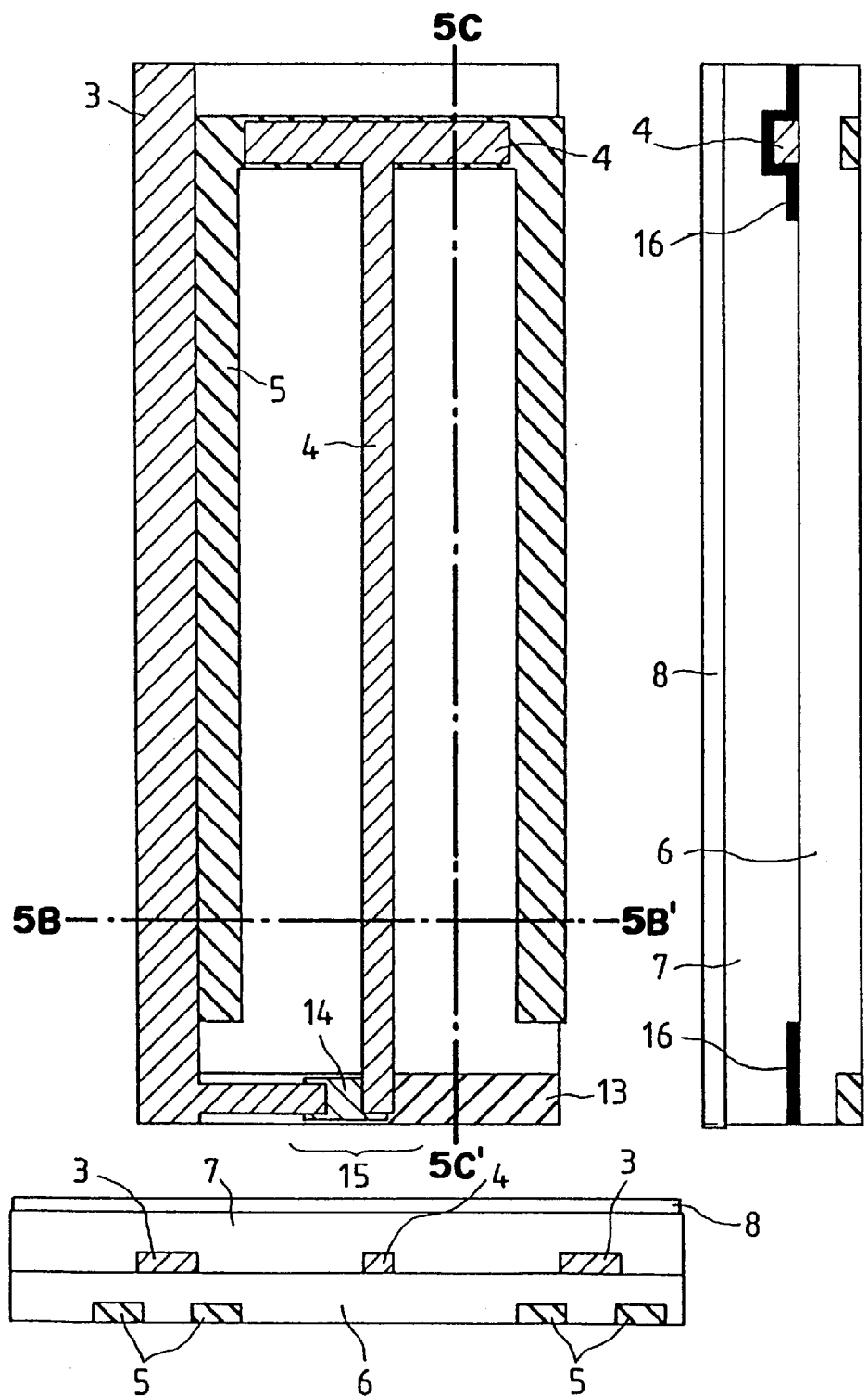

LIQUID CRYSTAL DISPLAY DEVICE WITH SUBSTANTIAL ELIMINATION OF RESIDUAL IMAGE

CROSS REFERENCE TO RELATED APPLICATION

This is a continuation of U.S. application Ser. No. 08/770,728, filed Dec. 19, 1996, now U.S. Pat. No. 5,914,761, which is a continuation of U.S. application Ser. No. 08/308,157, filed Sep. 20, 1994, now U.S. Pat. No. 5,600,464, issued Feb. 4, 1997, the subject matter of which is incorporated by reference herein.

BACKGROUND OF THE INVENTION

The present invention relates to a liquid crystal display device having a high picture quality and in which residual image is substantially eliminated.

In a conventional liquid crystal display device, two facing transparent electrodes formed respectively on each of two substrates are used as the electrodes for driving the liquid crystal layer. In such a device, a display method represented by a twisted nematic display has been adopted, wherein the crystal display operates by being supplied with an electric field having approximately a vertical direction to the substrate boundary planes. On the other hand, in arrangements wherein the electric field has approximately a parallel direction to the substrates, methods utilizing a pair of comb-like electrodes are disclosed, for example, in JP-B-63-21907 and WO91/10936. In these cases, the electrodes are not necessarily transparent, since opaque metallic electrodes having high conductivity are used. However, the above-mentioned publications do not provide any teachings concerning liquid crystal material, oriented film and insulating film, which are necessary for obtaining high picture quality when driving the display system, in which the electric field is supplied to the liquid crystal in an approximately parallel direction to the substrate plane (hereinafter referred to as an in-plane switching system), with an active matrix driving method or a simple matrix driving method.

When a character or a drawing is displayed-in a display plane, an image of the character or the drawing remains for a while in the display plane even after erasing, and sometimes it causes an uneven display known as an afterimage. The afterimage is a common problem which causes deterioration of image quality for both the display method wherein the electric field is supplied in a perpendicular direction and the display method involving the in-plane switching system. Especially, in case of the in-plane switching system, the afterimage is generated more easily than the case wherein the electric field is generated perpendicularly to the substrate plane.

SUMMARY OF THE INVENTION

The object of the present invention is to provide a liquid crystal display device providing a high picture quality and in which the problems of residual image is substantially eliminated.

In order to solve the above described problems, the inventors realized the invention explained hereinafter.

As a first feature, a liquid crystal display (hereinafter called a liquid crystal display device of an in-plane switching system) is provided, wherein:

display picture elements are composed of electrodes on a substrate;

an orienting film for a liquid crystal layer is formed on the substrate directly or via an insulating layer;

the substrate is arranged so as to face another transparent substrate on which another orienting film is formed;

the liquid crystal layer is held between the above two substrates;

the electrodes are formed so as to generate an electric field which is applied to the liquid crystal layer in a direction parallel to the substrate;

the electrodes are connected to external control means; and a polarizer for changing the optical characteristics of the liquid crystal layer is provided, wherein a brightness recovering time of no greater than five minutes is obtained, where the brightness recovering time is the time until the brightness of a displayed portion that has been displayed for 30 minutes and is turned off returns to the background brightness.

In the liquid crystal display device of an in-plane switching system, the display picture elements are composed of scanning signal electrodes and image signal electrodes. Further, provision of picture element electrodes and active elements are desirable, but, this condition is not essential to the present invention.

Here, the orienting film refers to a film having a function to orient the liquid crystal. The insulating film refers to a film for electrically insulating, however, the film concurrently can have a function to protect an electrode.

As a second feature of this invention, a liquid crystal display device of an in-plane switching system is provided, wherein the necessary time for recovering brightness is less than five minutes, and respective products $(\epsilon_r\rho)_{LC}$, $(\epsilon_r\rho)_{AF}$, and/or $(\epsilon_r\rho)_{PAS}$) of a specific dielectric constant $\epsilon_r$ and a specific resistivity $\rho$ of the liquid crystal layer (abbreviated as LC), the orienting film (abbreviated as AF), and/or the insulating film (abbreviated as PAS) are in a range of $1 \times 10^9$ $\Omega \cdot cm - 8 \times 10^{15}$ $\Omega \cdot cm$.

Here, the dielectric constant of the liquid crystal layer $\epsilon_r$ is an average dielectric constant expressed by the following equation:

$$\epsilon_r = (\epsilon_\| + 2\epsilon_\perp)/3$$

where, $\epsilon_\|$ is the dielectric constant in a molecular major axis direction, and $\epsilon_\perp$ is the dielectric constant in a molecular minor axis direction.

When $\epsilon_r\rho$ is less than $1 \times 10^9$ $\Omega \cdot cm$, the device can not maintain its insulating property and a sufficient voltage keeping rate.

As a third feature of this invention, a liquid crystal display device of an in-plane switching system is provided, wherein the necessary time for recovering brightness is less than five minutes, and respective values of surface resistance of the orienting film and/or the insulating film are in a range of $3 \times 10^{11}$ $\Omega/\square - 2.5 \times 10^{18}$ $\Omega/\square$.

When the values of surface resistance are less than $3 \times 10^{11}$ $\Omega/\square$, the device can not maintain its insulating property and voltage keeping rate.

As a fourth feature of this invention, a liquid crystal display device of an in-plane switching system is provided, wherein respective products $((\epsilon_r\rho)_{LC}$, $(\epsilon_r\rho)_{AF}$, and/or $(\epsilon_r\rho)_{PAS})$ of a specific dielectric constant $\epsilon_r$ and a specific resistivity $\rho$ of the liquid crystal layer, the orienting film, and/or the insulating film mutually have an approximately similar value.

As a fifth feature of this invention, a liquid crystal display device similar to the fourth feature is provided, wherein the respective products are in a range of $1\times10^9$ Ω·cm–$8\times10^{15}$ Ω·cm.

As a sixth feature of this invention, a liquid crystal display device of an in-plane switching system is provided, wherein a ratio of the maximum value to the minimum value of respective products $((\in_r\rho)_{LC}, (\in_r\rho)_{AF},$ and/or $(\in_r\rho)_{PAS})$ of a specific dielectric constant $\in_r$ and a specific resistivity $\rho$ of the liquid crystal layer, the orienting film, and/or the insulating film is equal to or greater than 1 and equal to or less than 100.

As a seventh feature of this invention, a liquid crystal display device of an in-plane switching system provided, wherein respective products $((\in_r\rho)_{LC}, (\in_r\rho)_{AF},$ and/or $(\in_r\rho)_{PAS})$ of a specific dielectric constant $\in_r$ and a specific resistivity $\rho$ of the liquid crystal layer, the orienting film, and/or the insulating film have a relationship expressed by the following equations (1) to (3).

$$0.1 \leq (\in_r\rho)_{LC}/(\in_r\rho)_{AF} \leq 10 \qquad (1)$$

$$0.1 \leq (\in_r\rho)_{LC}/(\in_r\rho)_{PAS} \leq 10 \qquad (2)$$

$$0.1 \leq (\in_r\rho)_{AF}/(\in_r\rho)_{PAS} \leq 10 \qquad (3)$$

As an eighth feature of this invention, a liquid crystal display device of an in-plane switching system is provided, wherein the sum of the film thickness of the orienting film and the insulating film on the substrate 1 is in a range 0.5–3 gm.

As a ninth feature of this invention, a liquid crystal display device according to any of the first to eighth features is provided wherein the device is provided with an input means for information;

a means for calculating or processing the information;

a device for outputting the calculated or processed information;

a memory device; and an internal power source.

In the liquid crystal display device of the present invention, the thickness of the insulating film is preferably in a range of 0.4–2 μm.

Further, in the liquid crystal display device of the present invention, the orienting film is preferably made of an organic material, and the insulating film is preferably made of an inorganic material. Furthermore, the orienting film is preferably made of an organic material, and the insulating film preferably has a double layer structure made of an inorganic material and an organic material.

Further, in the liquid crystal display device of the present invention, the orienting film is preferably made of an organic material and the insulating film is preferably made of an inorganic material, and the orienting film made of an organic material is preferably thicker than the insulating material made of an inorganic material.

Further, both of the orienting film and the insulating film are preferably composed of an organic material, and both of the orienting film and the insulating film are preferably composed of the same material. Furthermore, one side of a plane of the orienting film which abuts the liquid crystal is flat.

In order to realize a color display having a high picture quality, a color filter is preferably provided on either one of the substrates, and an insulator is preferably inserted between the color filter and the liquid crystal layer. Further, a film having a function to flatten steps on the color filter is preferably composed of an organic material, and a film composed of an inorganic material is preferably formed on the film composed of organic material. Furthermore, the orienting film is preferably formed on the substrate having a color filter by the intermediary of a layer composed of inorganic material.

BRIEF DESCRIPTION OF THE DRAWINGS

FIGS. 4(a) to 4(c) are a plan view and side and front cross sections, respectively, of a picture element unit;

FIGS. 5(a) to 5(c) are a plan view and side and front cross sections, respectively, of a picture element unit;

DESCRIPTION OF THE INVENTION

Hereinafter, a principle of operation of an in-plane switching system, wherein an electric field is supplied in a direction parallel to a substrate, is explained, and subsequently, the operation of the present invention is explained.

Figure 1A:
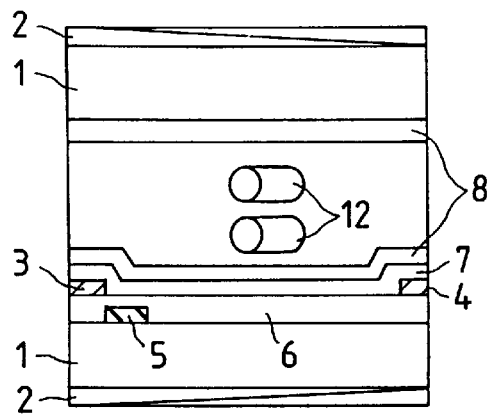
FIGS. 1(a)–1(d) are schematic diagrams for explaining the operation of the liquid crystal in a liquid crystal display device supplied with in-plane switching to the substrate according to the present invention.
Figure 1B:
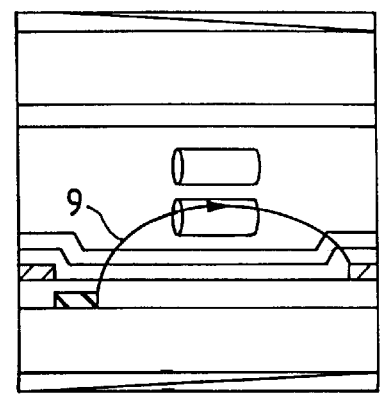
Figure 1C:
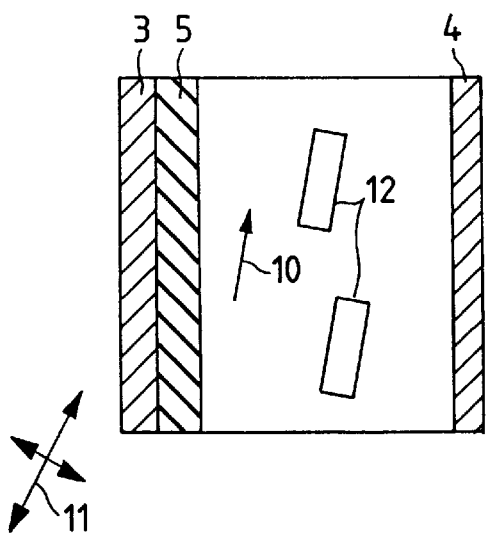
Figure 1D:
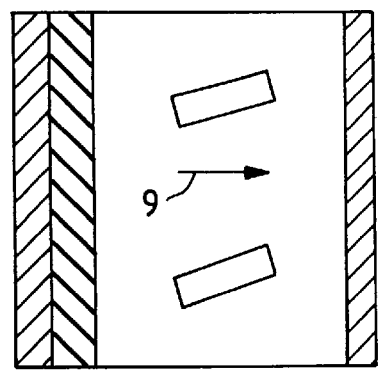
Figure 2:
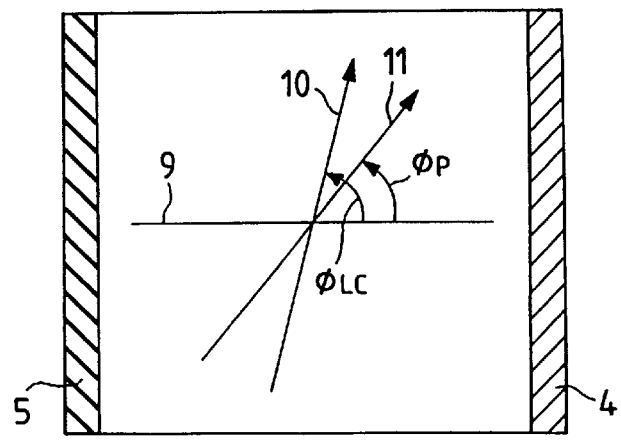
FIG. 2 is a schematic diagram indicating angles formed by the orienting direction of a molecular longitudinal axis on a boundary plane to an electrical field direction, and by the transmitting axis of a polarizer to the electrical field direction in the liquid crystal display device supplied with a horizontal electric field to the substrate according to the present invention.

First of all, an angle $\phi_P$, which is the angle formed between the polarized light transmitting axis 11 of a polarizer and the direction of the electric field 9, and an angle $\phi_{LC}$, which is an angle formed between the direction of the liquid crystal major axis (optical axis) 10 in the vicinity of the liquid crystal boundary and the direction of the electric field 9, are shown in FIG. 2. The polarizer and the liquid crystal boundary exist in pairs at each of an upper side and a lower side, respectively.

Therefore, the angles are expressed as $\phi_{P1}$, $\phi_{P2}$, $\phi_{LC1}$, and $\phi_{LC2}$, if necessary. FIG. 2 corresponds to a front view of FIGS. 1(*a*) to 1(*d*), which is explained later.

FIGS. 1(*a*) and 1(*b*) are side cross sections indicating liquid crystal operation in a liquid crystal panel of the present invention, and FIGS. 1(*c*) and 1(*d*) are front views of the respective FIGS. 1(*a*) to 1(*d*). In FIG. 1, the active elements are omitted. Further, in accordance with the present invention, stripe-shaped electrodes are provided so as to form a plurality of picture elements, but, only one picture element is shown in FIGS. 1(*a*) to 1(*d*). A side cross section of a cell under no voltage is shown in FIG. 1(*a*), and the front view of FIG. 1(*a*) is shown in FIG. 1(*c*). Linear signal electrodes 3, 4, and a common electrode 5 are formed at the inside of one pair of transparent substrates 1, an insulating film 7 is provided on the substrates and the electrodes, and an orienting film 8 is supplied and processed for orientation on the insulating film 7. A liquid crystal composition is held between the substrates. A bar-shaped liquid crystal molecule 12 is oriented so as to have a small angle to a longitudinal direction of the stripe-shaped electrodes, that is 45 degrees<$\phi_{LC}$<135 degrees, or, −45 degrees<$\phi_{LC}$<−135 degrees, when no electric field is supplied. An example is explained hereinafter in which an orienting direction of the liquid crystal molecule at the upper and the lower boundaries is parallel, that is $\phi_{LC1}=\phi_{LC2}$. Further, dielectric anisotropy of the liquid crystal composition is assumed as positive.

Next, when an electric field 9 is supplied, the liquid crystal molecule changes its orienting direction to the direction of the electric field as shown in FIGS. 1(*b*) and 1(*d*). Therefore, optical transmission becomes changeable by applying an electric field when a polarizer 2 is arranged at a designated angle 11. As explained above, in accordance with the present invention, a display giving contrast becomes possible without the transparent electrodes. The dielectric anisotropy of the liquid crystal composition is assumed as positive in the present description, but negative anisotropy is also usable. In a case of the negative anisotropy, the liquid crystal molecule is oriented at a first oriented condition so as to have a small angle, $\phi_{LC}$, to a vertical direction to the longitudinal direction of the stripe-shaped electrodes, that is −45 degrees<$\phi_{LC}$<45 degrees, or, 135 degrees<$\phi_{LC}$<225 degrees.

In FIGS. 1(*a*) to 1(*d*), an example wherein a common electrode is in a different layer from the signal electrode and the picture element electrode is shown, but the common electrode can be in the same layer with the signal electrode and the picture element electrode. A typical example of a picture element structure in which the common electrode is in the same layer with the picture element electrode is shown in FIGS. 3(*a*) to 3(*c*), and typical examples of a picture element structure in which the common electrodes are in different layers from the picture element electrodes are shown in FIGS. 4(*a*)–4(*c*) and 5(*a*)–5(*c*). Further, even if the common electrode is not provided, the scanning electrode can be given the same function as the common electrode. However, the gist of the present invention explained hereinafter is in insulating materials for composing the liquid crystal element, and is applicable to various electrode structures and thin film transistor structures.

Figure 11A:
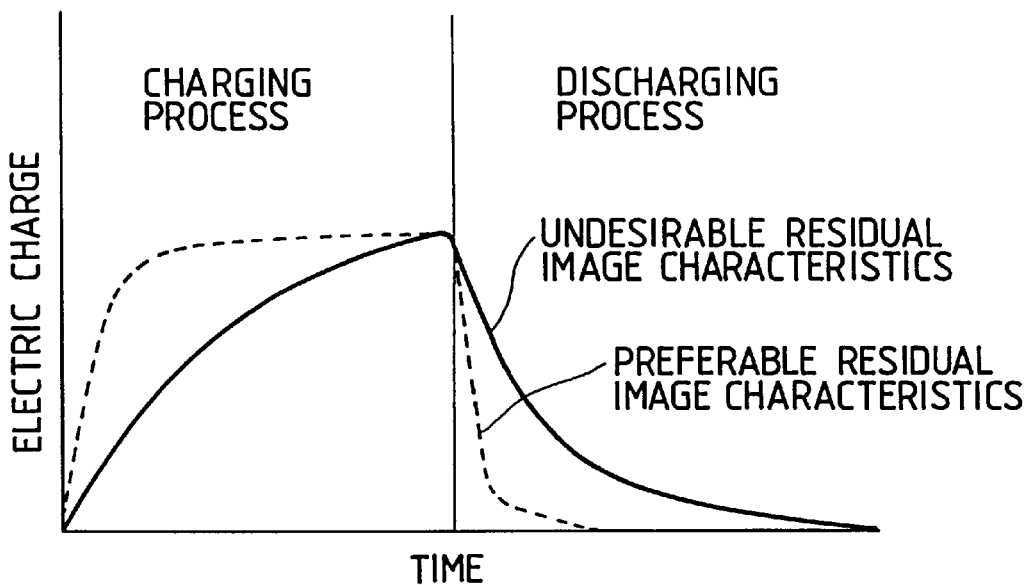
FIGS. 11(a) and 11(b) are model graphs indicating relationships between a charging process and a discharging process of electric charge, and residual image characteristics.
Figure 11B:
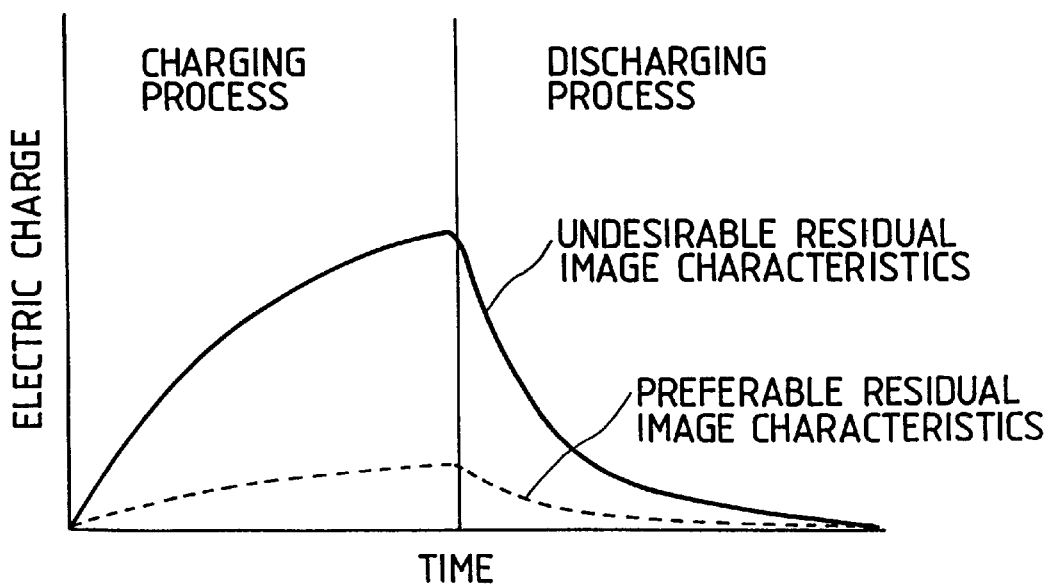

As explained above, a liquid crystal display device having a high picture quality and in which residual images are substantially eliminated can be obtained by making a necessary time for recovering the brightness of the display device, after displaying an identical drawing pattern for 30 minutes, less than five minutes. The residual images are induced when polarization is generated in the liquid crystal layer, the orienting film, or the insulating film for any reason. Therefore, the residual images can be reduced concretely, as explained in the second feature, by making respective products (($\in_r\rho)_{LC}$, ($\in_r\rho)_{AF}$, and/or ($\in_r\rho)_{PAS}$) of a specific dielectric constant $\in_r$ and a specific resistivity $\rho$ of the liquid crystal layer, the orienting film, and/or the insulating film, respectively, equal to or less than $8\times10^{15}$ $\Omega\cdot$cm, because any accumulated electric charge can be relaxed quickly. A model graph indicating the principle of residual image reduction in the above case is shown in FIG. 11(*a*). That means, the residual image can be reduced because the relaxing speed is fast even if an electric charge has accumulated, and the electric charge is discharged quickly. Further, the residual image can be reduced by decreasing the accumulated electric charge, as shown in FIG. 11(*b*), even if the relaxing speed is slow. Therefore, the residual image problem can be eliminated by making the surface resistance of the orienting film and/or the insulating film equal to or less than $2.5\times10^{18}$ $\Omega/\square$ in order to decrease any accumulating electric charge, as stated in the third feature. Furthermore, as stated in the fourth, sixth, and seventh features, the residual image can be reduced further by substantially equalizing products of specific dielectric constant $\in_r$ and specific resistivity $\rho$ of the liquid crystal layer, the orienting film, and the insulating layer. As described previously, the residual image is induced when polarization is generated in the liquid crystal layer, the orienting film, or the insulating film for any reason. And, the polarization in the respective layer and films interfere with each other, so that the polarization generated in the orienting film generates a secondary polarization in the liquid crystal layer.

For instance, if any polarization remains in the orienting film in a relaxation process of polarization of the liquid crystal layer, the polarization in the orienting film affects the ability of the liquid crystal layer to prevent the relaxation of the polarization in the liquid crystal layer. Accordingly, in order to promote the relaxation generated in the respective layer or films without interference, respective relaxation times must be equal. The inventors of the present invention found that the above described principle can be established significantly using a method wherein the electric field is supplied in a direction parallel to the substrate, that is, when using the in-plane switching method. In the in-plane switching method, electric equivalent circuits corresponding to the respective liquid crystal layer, the insulating film, and the orienting film are connected in parallel.

Therefore, for instance, when a product ($\in_r\rho$) of specific dielectric constant $\in_r$ and specific resistivity $\rho$ for the orienting film or the insulating film is larger than that for the liquid crystal layer, a residual voltage in the orienting film or the insulating film is supplied to the liquid crystal layer as an extra voltage, and consequently, a residual image is induced. Furthermore, in consideration that the resistance R can be expressed by the equation, $R=\rho d/S$ (where $\rho$: specific resistivity, d: length in the direction of the electric field, S: vertical cross section area to the electric field), the in-plane switching system has a significantly larger resistance in the element structure than the method wherein the electric field is supplied to the substrate perpendicularly. That means that the residual direct current component in the in-plane switching system is remarkably large. In the above described case, a combination of the fourth features, the sixth feature or the seventh feature with the second feature as the fifth feature makes it possible to relax the accumulated charge in a short time without causing initial interference in the liquid crystal layer, the orienting film, and/or the insulating film in the course of relaxing the accumulated charge.

Therefore, the combination is an effective means for reducing the residual image.

The above principle can be established in the in-plane switching system regardless of whether a simple matrix driving method or an active matrix driving method is employed.

Further, the resistance components of the orienting film and the insulating film at each of the picture elements can be decreased by making the sum of the thicknesses of a film having a function to orient liquid crystal (orienting film) and a film having functions to insulate electrically and to protect the electrode group (insulating film) fall within a range of from 0.5 $\mu$m to 3 $\mu$m, desirably from 0.7 $\mu$m to 2.8 $\mu$m. Actually, the thickness of the insulating film is desirably selected in a range from 0.4 $\mu$m to 2 $\mu$m as described above in order to deduce additional effects of the steps on the substrate whereon the electrode group is mounted. As explained previously, in a method wherein the direction of the electric field supplied to the liquid crystal is approximately parallel to the substrate plane, electric equivalent circuits corresponding to the respective liquid crystal layer, the insulating film, and the orienting film are connected in parallel.

Accordingly, a voltage which has remained in the orienting film and the insulating film is supplied directly to the liquid crystal layer. Considering the fact that residual images are generated by supplying a residual voltage in the orienting film and the insulating film to the liquid crystal layer, the residual voltage in the orienting film and the insulating film can be reduced, and an excessive voltage supplied to the liquid crystal layer can be eliminated by decreasing resistance components equivalent to the orienting film and the insulating film at each of the picture elements. In order to decrease the resistance components in the orienting film and the insulating film, the film thicknesses of the orienting film and the insulating film must be increased for purposes of enlarging the cross sectional area perpendicular to the direction of the electric field.

The insulating film can be formed with a reliable inorganic material, and the orienting film can be formed with an organic material. Further, the insulating film can be formed in a double layer structure which is composed of an inorganic material layer and a relatively easily shapable organic material layer.

Figure 8A:
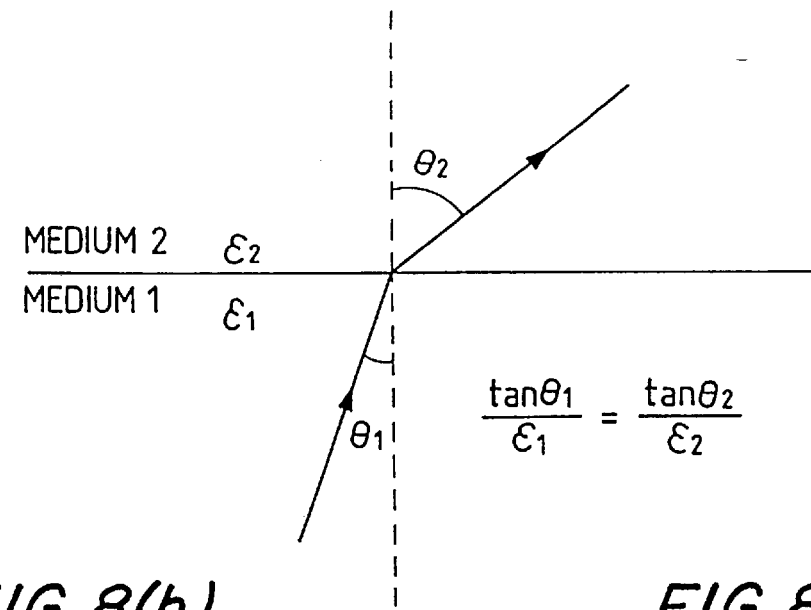
FIGS. 8(a) to 8(c) are schematic illustrations indicating refraction law of electric force line, and variation of horizontal electric field strength in a liquid crystal layer depending on relative dielectric constant and thickness of the layer in respective layers.
Figure 8B:
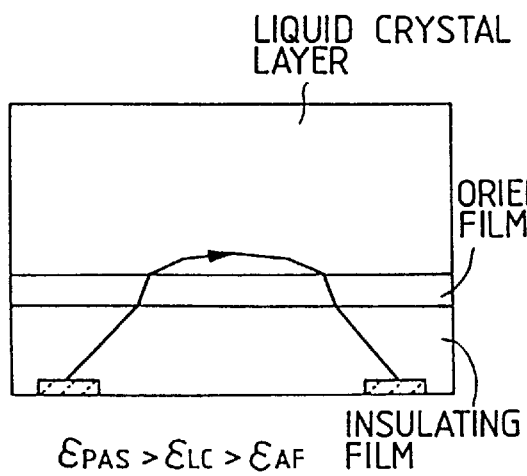
Figure 8C:
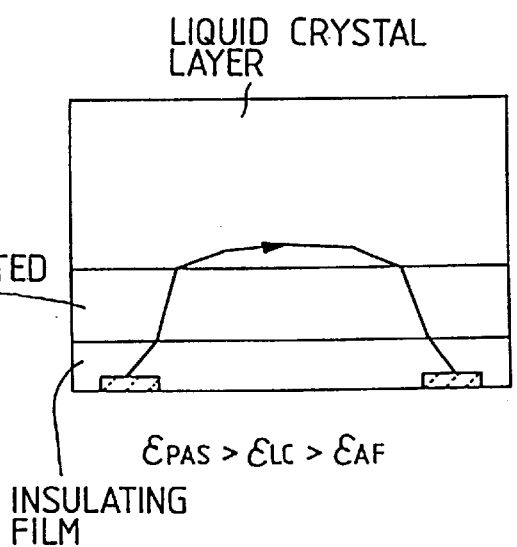
Figure 9A:
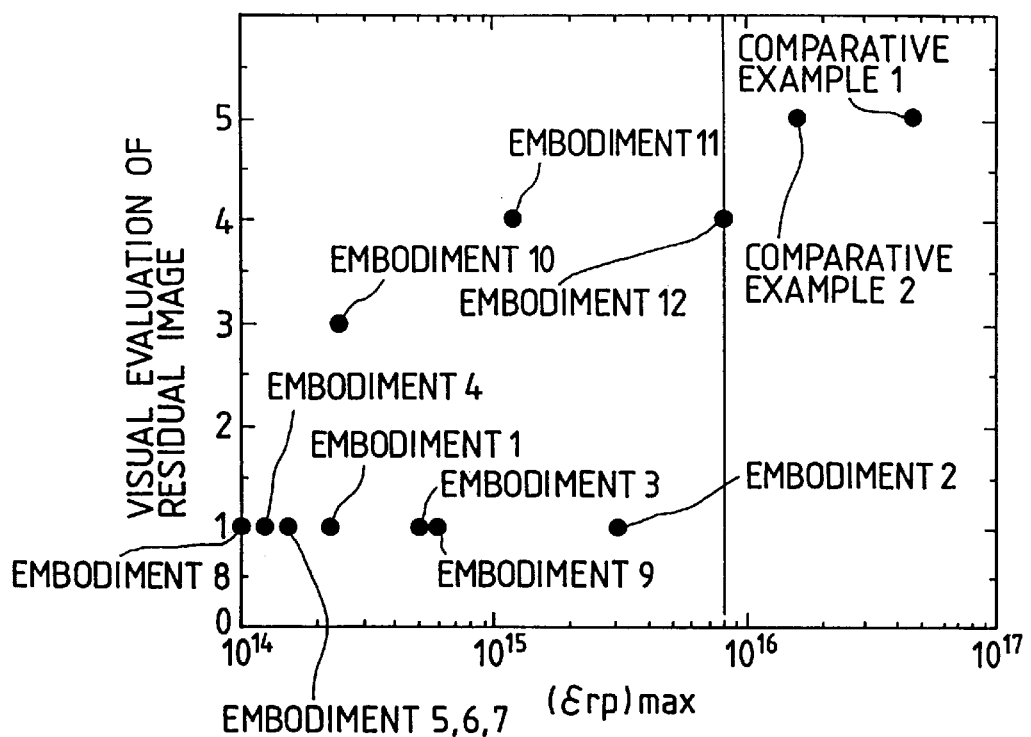
FIG. 9(a) is a graph indicating relationships among the maximum value of products $\in\rho$ of respective specific resistivity $\rho$ and specific dielectric constant $\in$ and residual image characteristics of a liquid crystal, an insulating film, and an orienting film.
Figure 9B:
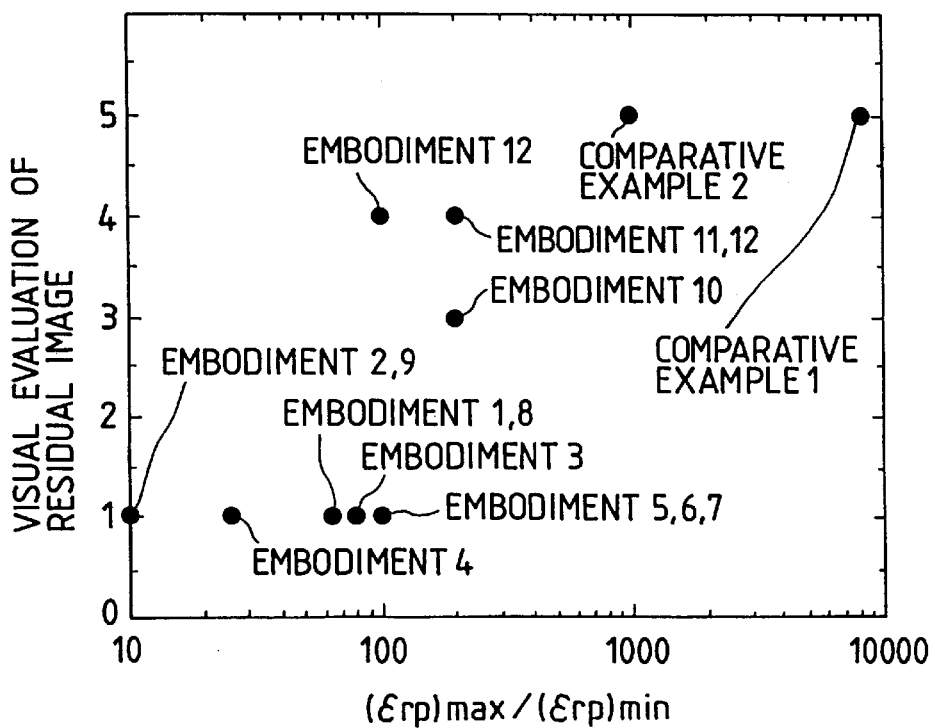
FIG. 9(b) is a graph indicating relationships among the ratio of the maximum value and the minimum value of products $\in\rho$ of respective specific resistivity $\rho$ and specific dielectric constant $\in$ and residual image characteristics of a liquid crystal, an insulating film, and an orienting film.

FIG. 8(a) is a schematic illustration indicating variation in the line of electric force in a liquid crystal layer depending on the magnitude of the dielectric constant in each of the layers. The smaller the dielectric constants in the orienting film and the insulating film are as compared to the dielectric constant of the liquid crystal layer, the more ideal will be the in-plane switching.

Accordingly, an electric field component horizontal to the substrate plane can be utilized effectively by replacing a layer of inorganic material with a layer of organic material having as low a dielectric constant as possible. Further, the above effect can be realized by making the insulating film with an organic material. Furthermore, fabricating the insulating film and the orienting film with the same material realizes a high efficiency in a manufacturing process. In order to improve picture quality in a liquid crystal display device, flattening the surface plane of the orienting film abutting on the liquid crystal is important. By the flattening, steps at the surface plane can be eliminated, and light leakage can be suppressed by making effects of rubbing uniform all through the surface plane.

In order to realize a color display using the in-plane switching system, it is necessary that only the insulating film be inserted between a color filter and the liquid crystal layer. In this regard, a conductive body existing in the interval between the color filter and the liquid crystal destroys a horizontal electric field.

Generally, an organic material, such as an epoxy resin, is used as a flattening film for a color filter, and transparent electrodes are provided on the flattening film. However, since the transparent electrodes are not necessary in the in-plane switching system, as stated previously, the flattening film contacts directly with the orienting film. In this case, printability of the orienting film sometimes causes troubles. Therefore, a layer of inorganic material, such as silicon nitride, provided on an upper portion of the flattening film is effective in improving printability. The color filter is not necessarily provided on facing planes of the substrates whereon the electrodes group existed; rather, preciseness of alignment can be improved by providing the color filter on the substrate plane whereon the active elements and electrodes group are mounted.

DETAILED DESCRIPTION OF THE EMBODIMENTS

Embodiment 1

Figure 3A:
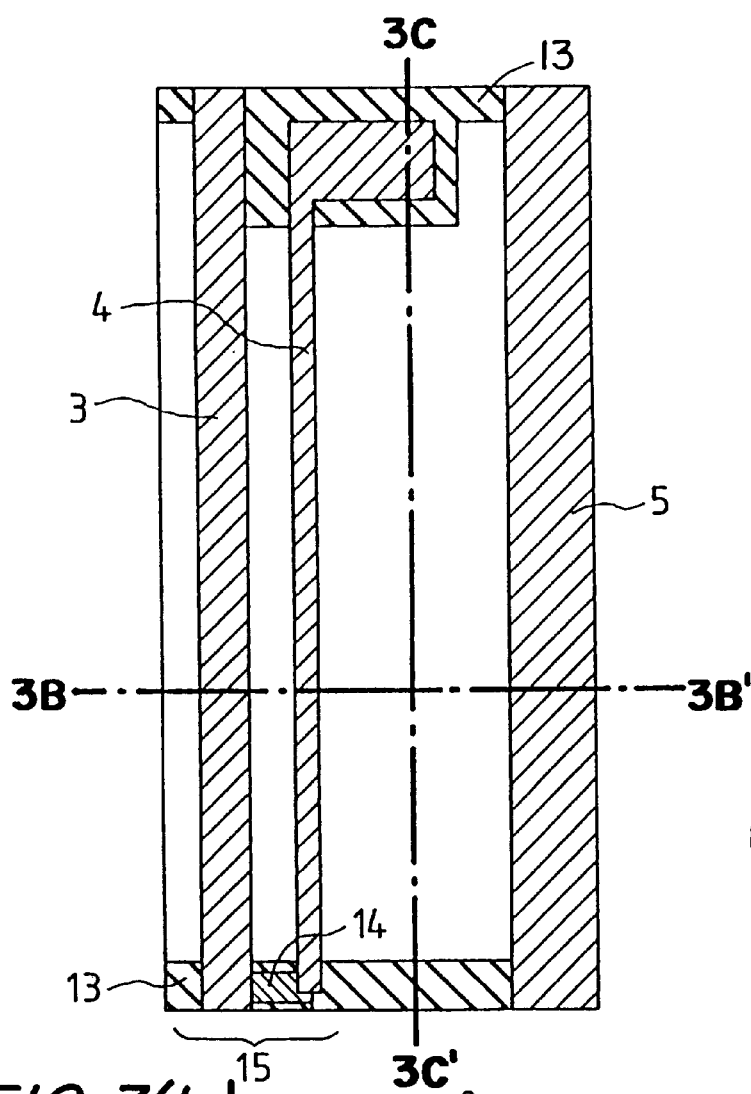
FIGS. 3(a) to 3(c) are a plan view and side and front cross sections, respectively, of a picture element unit.
Figure 3C:
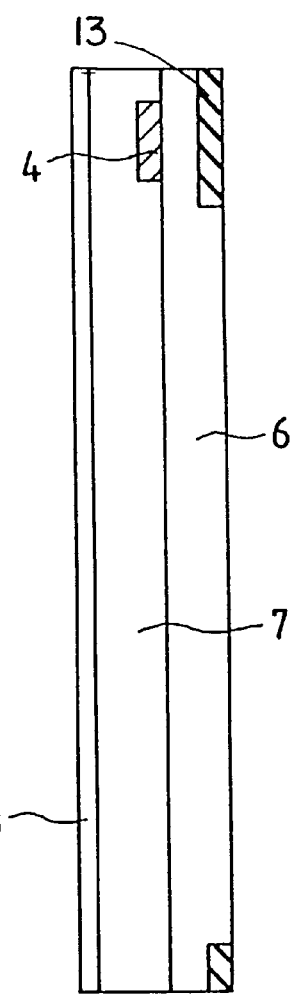
Figure 3B:
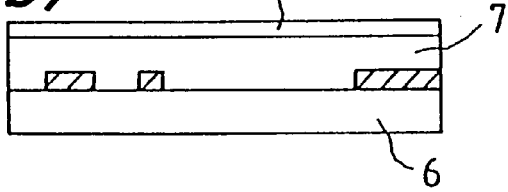

FIGS. 3(a) to 3(c) indicate a structure of an electrode for a picture element unit forming a first embodiment of the present invention. A scanning signal electrode 13 made of aluminum was formed on a polished glass substrate, and the surface of the scanning signal electrode was coated with alumina film, i.e. anodic oxide film of aluminum. A gate silicon nitride (gate SiN) film 6 and an amorphous silicon (a-Si) film 14 were formed so as to cover the scanning signal electrode, and a n-type a-Si film, a picture element electrode 4 and an image signal electrode 3 were formed on the a-Si film. Further, a common electrode 5 was provided in the same layer as the picture element electrode 4 and the image signal electrode 3. The picture element electrode 4 and the signal electrode 3 had a structure, as shown in FIG. 3, parallel to the strip-shaped common electrode 5 and crossing across the scanning signal electrode 13, and a thin film transistor 15 and a group of metallic electrodes were formed at one end of the substrate. In accordance with the above structure, an electric field 9 could be supplied between the picture element electrode 3 and the common electrode 5 at one end of the substrate in a direction approximately parallel to substrate plane. All of the electrodes on the substrate were made of aluminum. But any metallic material having a low electric resistance, such as chromium, copper, and others, can be used.

Figure 7:
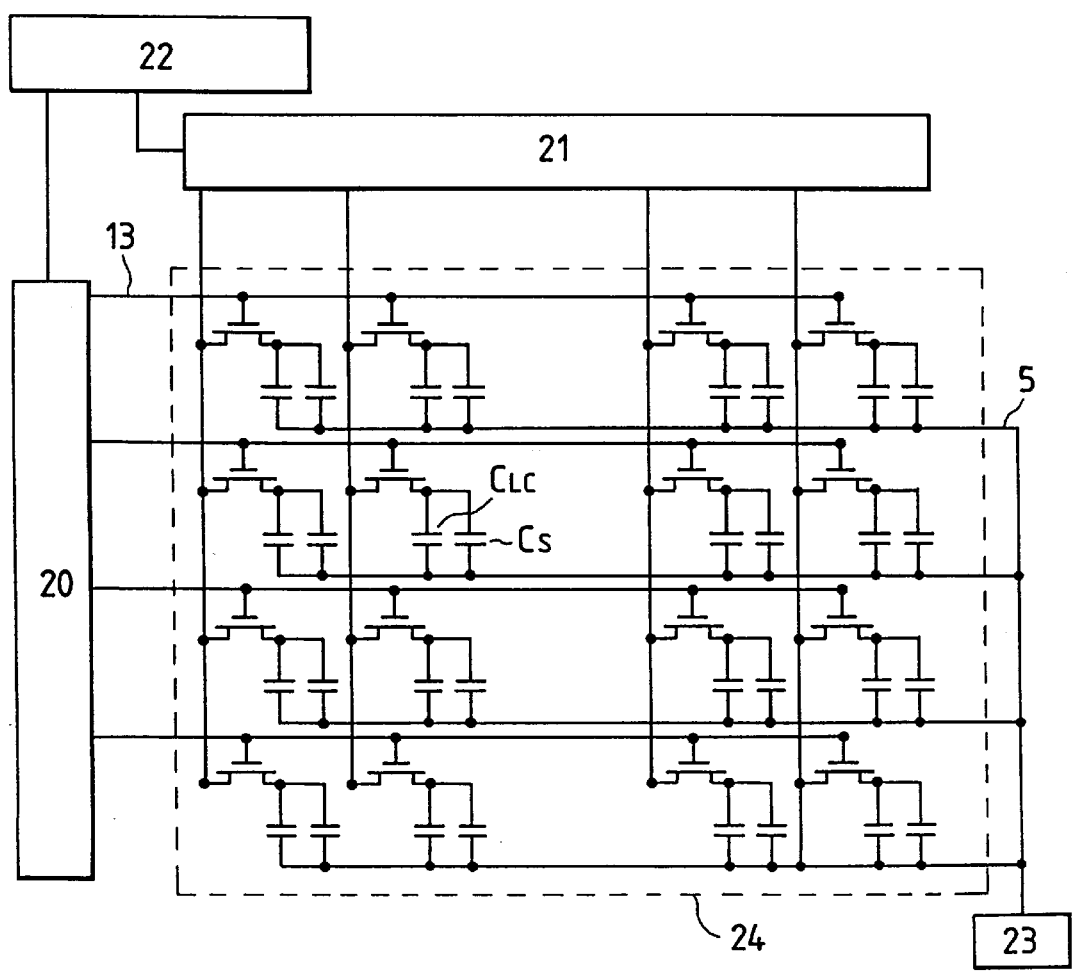
FIG. 7 is a schematic diagram indicating a typical example of system composition in the liquid crystal display device according to the present invention.

The number of the picture elements was 40(x3)×30(i.e. n=120, m=30), and the pitches of the picture elements were 80 $\mu$m in width (i.e. between common electrodes) and 240 $\mu$m in length (i.e. between gate electrodes). The width of the common electrode 5 was made 12 $\mu$m, which was narrower than the gap between adjacent common electrodes, in order to secure a large opening fraction. Three strip-shaped color filters respectively for red (R), green (G), and blue (B) were provided on a substrate facing the substrate having a thin film transistor. On the color filters, transparent resin was laminated in order to flatten the surface of the color filter. As material for the above transparent resin, an epoxy resin was used. Further, an orienting controlling film made of polyamide group resin was applied on the transparent resin. A driving LSI was connected to the panel, as shown in FIG. 7, a vertical scanning circuit 20 and an image signal driving circuit 21 were connected to the TFT substrate, and the active matrix was driven by a scanning signal voltage, an image signal voltage and a timing signal supplied from a power source circuit and a controller 22.

The directions of the upper and the lower boundary planes were approximately parallel mutually, and formed an angle of 15 degrees ($\phi_{LC1}=\phi_{LC2}=15°$) to the direction of the supplied electric field (FIG. 2). A gap d was kept by holding dispersed spherical polymer beads between the substrates at 6.5 $\mu$m interval under a liquid crystal filled condition. The panel was held between two polarizers (made by Nitto Denko Co., G1220DU), the polarizing light transmitting axis of one polarizer was selected as approximately parallel to a rubbing direction, i.e. $\phi_{P1}=15°$, and the axis of the other polarizer was selected as perpendicular to the rubbing direction, i.e. $\phi_{P2}=-75°$. Accordingly, normal closed characteristics were obtained.

Between the substrates, a liquid crystal ZLI-2806 (made by Merck Co.) containing trans, trans-4,4'dipentyl-trans-1, 1'dicyclohexane-4-carbonitrile for a main component having a negative dielectric anisotropy $\Delta\in$ was held. The liquid crystal had a specific resistivity of $5.1\times10^{11}$ $\Omega$cm and an average specific dielectric constant of 6.5. While, silicon nitride(SiN) was used as for an insulating film, and its specific resistivity was $2.5\times10^{13}$ $\Omega$cm and specific dielectric constant was 8. As for an orienting film, a polyamide orienting film made from 2,2-bis[4-(p-aminophenoxy) phenylpropane and pyromellitic acid dianhydride was used, and its specific resistivity was $7.5\times10^{13}$ $\Omega$cm and its average specific dielectric constant was 2.9. Accordingly, respective products ($\in_r\rho$) of specific resistivity $\rho$ and specific dielectric constant $\in_r$ of the liquid crystal layer, the insulating film, and the orienting film, respectively, was less than $8\times10^{15}$ $\Omega$cm, and the ratio of the maximum value and the minimum value of the three bodies, $((\in_r\rho)_{max}/(\in_r\rho)_{min})$, was less than 100.

The residual image was evaluated by visual observation with five rankings. An identical figure pattern was displayed for thirty minutes, and samples were classified by necessary time for recovering brightness after switching off the display. Samples were evaluated and classified as follows.

Sample of rank 5 was the one which necessitated more than five minutes for recovering brightness, rank 4 was from one minute to less than five minutes, rank 3 was from 30 seconds to less than one minute, rank 2 was less than 30 seconds but generation of any residual image was felt, and rank 1 was no residual image at all.

The sample in the embodiment 1 was evaluated as rank 1 because no residual image was observed at all.

The present invention relates to use of a specific dielectric constant and specific resistivity for the insulating material composing the element, and accordingly, the present invention is applicable to various structures of electrodes and TFTs.

Embodiment 2

FIGS. 4(a) to 4(c) indicate a structure of an electrode for a picture element unit forming a second embodiment of the present invention. A scanning signal electrode 13 and a common electrode 5 made of aluminum was formed on a polished glass substrate, and the surface of the scanning signal electrode was coated with an alumina film, i.e. anodic oxide film of aluminum. A gate silicon nitride (gate SiN) film 6 was formed so as to cover the scanning signal electrode 13 and the common electrode 5. Subsequently, an amorphous silicon (a-Si) film 14 and an n-type a-Si film on the a-Si film were formed. Further, a picture element electrode 4 and a signal electrode 3 were formed. Accordingly, the picture element electrode 4 and the common electrode 5 were in different layers mutually. The picture element electrode had an H-shaped structure, as shown in FIG. 4, and the common electrode 5 had a cruciform structure, a part of each of the electrodes had a structure functioning as capacitance elements. In accordance with the above structure, an electric field could be supplied between the picture element electrode 4 and the common electrode 5 at one end of the substrate in a direction approximately parallel to the substrate plane. All of the electrodes on the substrate were made of aluminum; however, any metallic material having low electric resistance, such as chromium, copper, and others, can be used. The number of picture elements was 320×160, and the pitches of the picture elements were 100 $\mu$m in width (i.e. between signal electrodes) and 300 $\mu$m in length (i.e. between scanning electrodes). Driving transistors were connected to the panel as shown in FIG. 7, a vertical scanning circuit 20 and an image signal driving circuit 21 were connected to the TFT substrate, and the active matrix was driven by a scanning signal voltage, an image signal voltage and a timing signal supplied from a power source circuit and a controller 22.

The directions of the upper and the lower boundary planes were approximately parallel mutually, and formed an angle of 105 degrees ($\phi_{LC1}=\phi_{LC2}=105°$) to a direction of the supplied electric field (FIG. 2). A gap d was kept by holding dispersed spherical polymer beads between the substrates at a 4.2 $\mu$m interval under a liquid crystal filled condition. The panel was held between two polarizers (made by Nitto Denko Co., G1220DU), the polarizing light transmitting axis of one polarizer was selected as approximately parallel to a rubbing direction, i.e. $\phi_{P1}=105°$, and the axis of the other polarizer was selected as perpendicular to the rubbing direction, i.e. $\phi_{P2}=15°$. Accordingly, normal closed characteristics were obtained.

Between the substrates there was disposed a liquid crystal of which the main component was a compound containing three fluoro groups at terminals having a positive dielectric anisotropy $\Delta\in$. The liquid crystal had a specific resistivity of $5.0\times10^{14}$ $\Omega$cm and an average specific dielectric constant of 6.1. Silicon nitride (SiN) was used as for an insulating film, and its specific resistivity was $3.0\times10^{14}$ $\Omega$cm and specific dielectric constant was 8. As for an orienting film, a polyamide orienting film made from 2, 2-bis[4-(p-aminophenoxy) phenylpropane and pyromellitic acid dianhydride was used, and its specific resistivity was $1.0\times10^{14}$ $\Omega$cm and its average specific dielectric constant was 2.9.

Accordingly, respective products ($\in_r\rho$) of specific resistivity $\rho$ and specific dielectric constant $\in_r$ of the liquid crystal layer, the insulating film, and the orienting film, respectively, were less than $8\times10^{15}$ $\Omega$cm, and the ratio of the maximum value and the minimum value of the three bodies, $((\in_r\rho)_{max}/(\in_r\rho)_{min})$, was less than 100.

The active matrix type liquid crystal display device as obtained above was evaluated as rank 1 in the evaluation of residual image, and no residual image was observed at all.

Embodiment 3

The composition of this embodiment is the same as embodiment 2 except for the following matters.

The insulating film had a double layer structure composed of an inorganic silicon nitride (SiN) layer and an organic epoxy resin layer, and a compound, RN-718 (made by Nissan Chemical Co.), was applied on the insulating film having two layers as an orienting film. The insulating film had a specific resistivity of $9.1\times10^{13}$ Ωcm and a specific dielectric constant of 3.1. And, the liquid crystal had a specific resistivity of $1.0\times10^{12}$ Ωcm and a specific dielectric constant of 6.1.

Accordingly, respective products ($\in_r\rho$) of specific resistivity $\rho$ and specific dielectric constant $\in_r$ of the liquid crystal layer, the insulating film, and the orienting film, respectively, were less than $8\times10^{15}$ Ωcm, and the ratio of the maximum value and the minimum value of the three bodies, $((\in_r\rho)_{max}/(\in_r\rho)_{min})$, was less than 100.

The active matrix type liquid crystal display device as obtained above was evaluated as rank 1 in the evaluation of residual image, and no residual image was observed at all.

Embodiment 4

FIGS. 5(a) to 5(c) indicate a structure of the electrode for a picture element unit forming the fourth embodiment of the present invention. A thin film transistor element 15 comprises a picture element electrode 4, a signal electrode 3, a scanning electrode 13 and amorphous silicon member 14. A common electrode 5 was in the same layer as the scanning electrode 13 and was formed by making a pattern from the same metallic layer. Further, the picture element electrode 4 and the signal electrode 3 were also formed by making a pattern from the same metallic layer. A capacitative element was formed of a structure holding a gate silicon nitride (gate SiN) film 6 with the picture element electrode 4 and the common electrode 5 in a region connecting two common electrodes 5. The picture element electrode 4 is arranged between two common electrodes 5, as shown in the front cross section taken along line A–A' (FIG. 5b). Pitches of the picture elements were 69 μm in width (i.e. between signal wiring electrodes) and 207 μm in length (i.e. between scanning wiring electrodes). The width of the respective electrodes was 10 μm. While, in order to secure a large opening fraction, the widths of the picture element electrode independently formed for a picture element unit and a portion extended to a longitudinal direction of the signal wiring electrode of the common electrode were made narrow, such as 5 μm and 8 μm, respectively. In order to realize as large an opening fraction as possible, the common electrode and the signal electrode were somewhat overlapped (1 μm) via the insulating film. Accordingly, a black matrix structure 16, wherein shading was provided only in a direction along the scanning wiring electrode, was formed. Consequently, a gap between the common electrode 5 and the picture element electrode 4 became 20 μm, and the length of the opening in a longitudinal direction became 157 μm, and a large opening fraction, such as 44.0%, was obtained. The number of picture elements was 320×160 with 320 signal wiring electrodes and 160 wiring electrodes. Driving transistors were connected to the panel as shown in FIG. 7, a vertical scanning circuit 20 and an image signal driving circuit 21 were connected to the TFT substrate, and the active matrix was driven by a scanning signal voltage, an image signal voltage and a timing signal supplied from a power source circuit and a controller 22.

The insulating film was composed of a single layer made of an organic epoxy resin, and a compound, RN-718 (made by Nissan Chemical Co.), was applied on the insulating film as an orienting film. In this case, the insulating film had a specific resistivity of $1.5\times10^{12}$ Ωcm and a specific dielectric constant of 3.0. The orienting film had a specific resistivity of $4.0\times10^{13}$ Ωcm and its specific dielectric constant was 3.1. The liquid crystal had a specific resistivity of $1.5\times10^{13}$ Ωcm and its specific dielectric constant was 6.1.

Accordingly, respective products ($\in_r\rho$) of specific resistivity $\rho$ and specific dielectric constant $\in_r$ of the liquid crystal layer, the insulating film, and the orienting film, respectively, was less than $8\times10^{15}$ Ωcm, and the ratio of the maximum value and the minimum value of the three bodies, $((\in_r\rho)_{max}/(\in_r\rho)_{min})$, was less than 100.

The active matrix type liquid crystal display device as obtained above was evaluated as rank 1 in the evaluation of residual image, and no residual image was observed at all.

Embodiment 5

The composition of this embodiment is the same as embodiment 4 except for the following matters.

A color filter was formed in the insulating film. First, a silicon nitride (SiN) layer was formed, and subsequently, the color filter was provided by printing. Further, epoxy resin was applied in order to flatten the surface. Then, a compound, RN-718 (made by Nissan Chemical Co.), was applied on the insulating film as an orienting film. The insulating film of the present embodiment had a specific resistivity of $4.4\times10^{11}$ Ωcm and a specific dielectric constant of 3.9. The orienting film had a specific resistivity of $4.9\times10^{13}$ Ωcm and a specific dielectric constant of 3.1. And, the liquid crystal had a specific resistivity of $1.6\times10^{13}$ Ωcm and a specific dielectric constant of 6.1.

Accordingly, respective products ($\in_r\rho$) of specific resistivity $\rho$ and specific dielectric constant $\in_r$ of the liquid crystal layer, the insulating film, and the orienting film, respectively, were less than $8\times10^{15}$ Ωcm, and the ratio of the maximum value and the minimum value of the three bodies, $((\in_r\rho)_{max}/(\in_r\rho)_{min})$, was less than 100.

The active matrix type liquid crystal display device as obtained above was evaluated as rank 1 in the evaluation of residual image, and no residual image was observed at all.

Embodiment 6

The composition of this embodiment is the same as embodiment 5 except for the following matters.

In order to increase the flatness of the orienting film plane abutting on the liquid crystal, the thickness of the orienting film was set five times, 5000 Å, that of the thickness (1000 Å) used in the above embodiment 5. Therefore, the flatness of the plane was increased, steps on the plane were decreased, and lapping treatment was performed uniformly. Consequently, light leakage at the step portion was eliminated.

The active matrix type liquid crystal display device as obtained above was evaluated as rank 1 in the evaluation of residual image, no residual image was observed at all, and contrast was improved over that of the embodiment 5.

Embodiment 7

The composition of this embodiment is the same as embodiment 6 except for the following matters.

The printability of the polyamide orienting film on the epoxy resin layer is not necessarily preferable. Therefore, a silicon nitride (SiN) film, an inorganic material film, was formed on the epoxy resin, which was effective to flatten the color filter and as an insulating film. In accordance with the above treatment, the printability of the orienting film was improved.

The active matrix type liquid crystal display device as obtained above was evaluated as rank 1 in the evaluation of residual image, since no residual image was observed at all, contrast was improved over that of the embodiment 5, printability of the orienting film was improved, and the production yield was increased.

Embodiment 8

The composition of this embodiment is the same as embodiment 4 except for the following matters.

A color filter was formed in the insulating film. First, a silicon nitride (SiN) layer was formed, and subsequently, the color filter was provided by printing. Further, an epoxy resin was applied in order to flatten the surface. Then, a compound, RN-718 (made by Nissan Chemical Co.), was applied on the insulating film as an orienting film. The insulating film of the present embodiment had a specific resistivity of $4.4 \times 10^{11}$ Ωcm and a specific dielectric constant of 3.9. The orienting film had a specific resistivity of $4.9 \times 10^{13}$ Ωcm and a specific dielectric constant of 3.1. And, the liquid crystal had a specific resistivity of $1.6 \times 10^{13}$ Ωcm and a specific dielectric constant of 6.1.

Accordingly, respective products $(\in_r \rho)$ of specific resistivity ρ and specific dielectric constant $\in_r$ Of the liquid crystal layer, the insulating film, and the orienting film, respectively, were less than $8 \times 10^{15}$ Ωcm, and the ratio of the maximum value and the minimum value of the three bodies, $((\in_r \rho)_{max}/(\in_r \rho)_{min})$, was less than 100.

The active matrix type liquid crystal display device as obtained above was evaluated as rank 1 in the evaluation of residual image, and no residual image was observed at all.

Embodiment 9

Figures 6A, 6B, 6C:
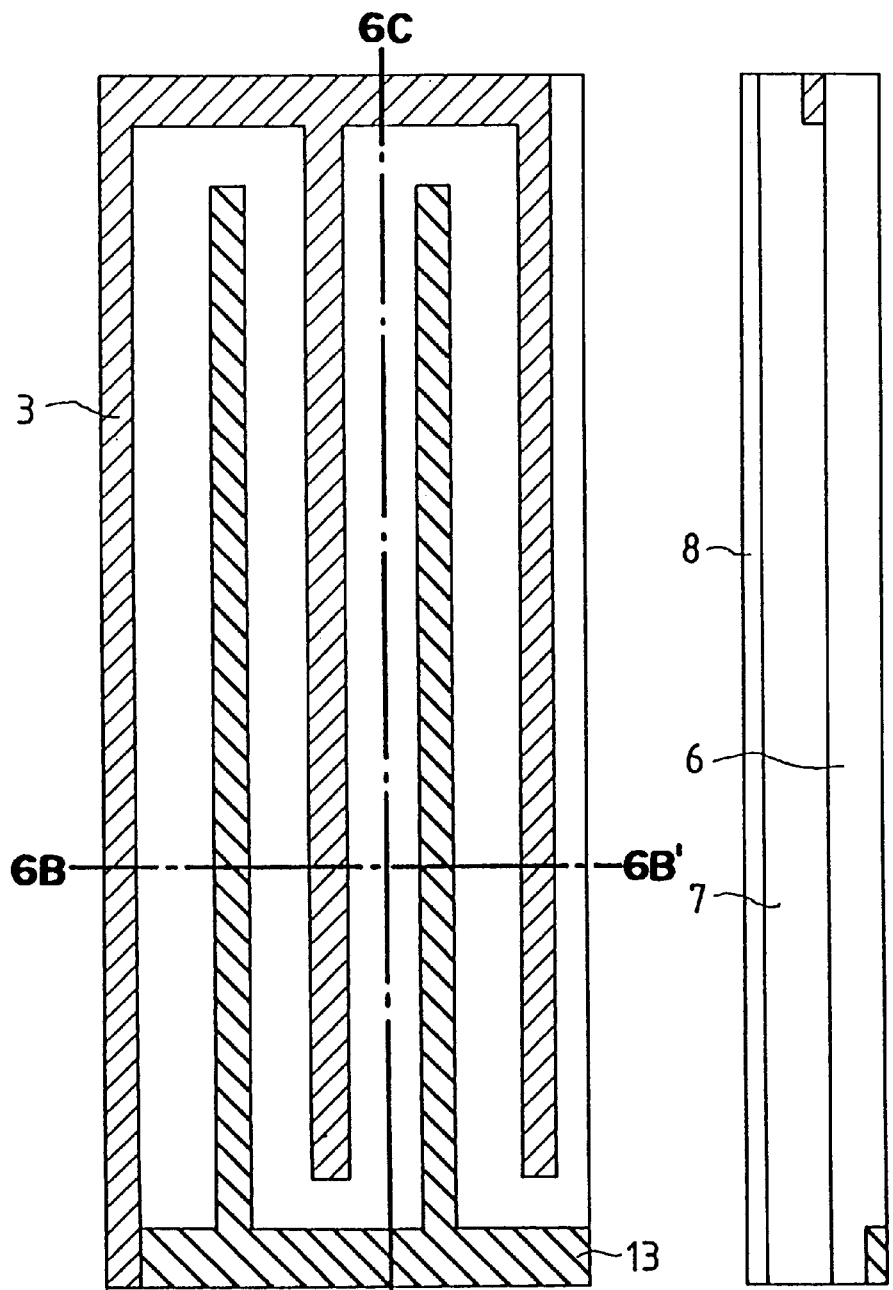
FIGS. 6(a) to 6(c) are a plan view and side and front cross sections, respectively, of a picture element unit.

FIGS. 6(a) to 6(c) indicate a structure of an electrode for a picture element unit forming the ninth embodiment of the present invention. In the present embodiment, thin film transistors were not provided for the picture element units. A scanning signal electrode 13 and a signal electrode 3 were in different layers mutually. Each of the electrodes were connected respectively to a scanning circuit driver and an image signal circuit driver, and the matrix was driven in a simple time-shared manner.

The directions of the upper and the lower boundary planes were approximately parallel mutually, and formed an angle of 105 degrees ($\phi_{LC1}=\phi_{LC2}=105°$) to the direction of the supplied electric field (FIG. 2). A gap d was kept by holding dispersed spherical polymer beads between the substrates at a 4.2 μm interval under a liquid crystal filled condition. The panel was held between two polarizers (made by Nitto Denko Co., G1220DU), the polarizing light transmitting axis of one polarizer was selected as approximately parallel to a rubbing direction, i.e. $\phi_{P1}=105°$, and the axis of the other polarizer was selected as perpendicular to the rubbing direction, i.e. $\phi_{P2}=15°$. Accordingly, normal closed characteristics were obtained.

In this embodiment, a liquid crystal, of which the main component was a trifluoro compound containing three fluoro groups at the terminals, having a specific resistivity of $1.0 \times 10^{14}$ Ωcm and an average specific dielectric constant of 6.1, was used. While, silicon nitride (SiN) was used for an insulating film, and its specific resistivity was $1.0 \times 10^{12}$ Ωcm and specific dielectric constant was 8. As for an orienting film, a polyamide orienting film made from 2, 2-bis[4-(p-aminophenoxy)phenylpropane and pyromellitic acid dianhydride was used, and its specific resistivity was $2.2 \times 10^{13}$ Ωcm and its average specific dielectric constant was 2.9.

Accordingly, respective products $(\in_r \rho)$ of specific resistivity ρ and specific dielectric constant $\in_r$ of the liquid crystal layer, the insulating film, and the orienting film were less than $8 \times 10^{15}$ Ωcm, and the ratio of the maximum value and the minimum value of the three bodies, $((\in_r \rho)_{max}/(\in_r \rho)_{min})$, was less than 100.

The active matrix type liquid crystal display device as obtained above was evaluated as rank 1 in the evaluation of residual image, and no residual image was observed at all.

Embodiment 10

The composition of this embodiment is the same as embodiment 1 except for the following matters.

The liquid crystal had a specific resistivity of $2.0 \times 10^{11}$ Ωcm and an average specific dielectric constant of 6.5. Silicon nitride (SiN) was used for the insulating film, and its specific resistivity was $3.0 \times 10^{13}$ Ωcm and its specific dielectric constant was 8. As for the orienting film, a polyamide orienting film made from 2, 2-bis[4-(p-aminophenoxy)phenylpropane and pyromellitic acid dianhydride was used, and its specific resistivity was $1.0 \times 10^{13}$ Ωcm and its average specific dielectric constant was 2.9.

Accordingly, respective products $(\in_r \rho)$ of specific resistivity ρ and specific dielectric constant $\in_r$ of the liquid crystal layer, the insulating film, and the orienting film were less than $8 \times 10^{15}$ Ωcm.

The active matrix type liquid crystal display evaluation of residual image, and the residual image time was within five minutes.

Embodiment 11

The composition of this embodiment is the same as embodiment 2 except for the following matters.

The liquid crystal had a specific resistivity of $2.0 \times 10^{14}$ Ωcm and an average specific dielectric constant of 6.1. Silicon dioxide ($SiO_2$) was used for the insulating film, and its specific resistivity was $1.0 \times 10^{13}$ Ωcm and its specific dielectric constant was 8. As for the orienting film, a polyamide orienting film made from 2, 2-bis[4-(p-aminophenoxy)phenylpropane and pyromellitic acid dianhydride was used, and its specific resistivity was $2.0 \times 10^{12}$ Ωcm and its average specific dielectric constant was 2.9.

Accordingly, respective products $(\in_r \rho)$ of specific resistivity ρ and specific dielectric constant $\in_r$ of the liquid crystal layer, the insulating film, and the orienting film were less than $8 \times 10^{15}$ Ωcm. The active matrix type liquid crystal display device as obtained above was evaluated as rank 4 in the evaluation of residual image, and the residual image time was within five minutes.

Embodiment 12

The composition of this embodiment is the same as embodiment 2 except for the following matters.

The liquid crystal had a specific resistivity of $2.0 \times 10^{13}$ Ωcm and an average specific dielectric constant of 6.1. Silicon nitride (SiN) was used as for the insulating film, and its specific resistivity was $1.0 \times 10^{15}$ Ωcm and its specific dielectric constant was 8. The orienting film was formed with a compound RN-718 (made by Nissan Chemical Co.), and its specific resistivity was $3.2 \times 10^{12}$ Ωcm and its average specific dielectric constant was 3.1.

Accordingly, respective products $(\in_r \rho)$ of specific resistivity ρ and specific dielectric constant $\in_r$ of the liquid crystal layer, the insulating film, and the orienting film were less than $8 \times 10^{15}$ Ωcm. The active matrix type liquid crystal display device as obtained above was evaluated as rank 4 in the evaluation of residual image, and the residual image time was within five minutes.

Embodiment 13

FIGS. 5(a) to 5(c) indicate a structure of an electrode for a picture element unit forming the thirteenth embodiment of the present invention. A thin film transistor 15 was composed of a picture element electrode 4, a signal electrode 3, a scanning electrode 13, and an amorphous silicon member 14. A common electrode 5 was in a same layer with the scanning electrode 13, and a pattern was made of the same metal layer. Further, the picture element electrode and the signal electrode were formed by a pattern made of the same metal. A capacitance element is formed as a structure wherein a gate silicon nitride (gate SiN) film 6 is inserted between the picture element electrode 4 and the common electrode 5 in a region where the two common electrodes 5 are connected. The picture element electrode 4 is arranged between the two common electrodes 5 as shown as a plan cross section taken along line A–A' in FIG. 5(b). The picture element has pitches of 69 μm in the horizontal direction (i.e. between signal wiring electrodes) and 207 μm in the vertical direction (i.e. between scanning wiring electrodes). The width of all of the electrodes is 10 μm.

While, in order to improve an opening fraction, the signal wiring electrode of the picture element electrode 4, formed independently for a picture element unit, and the common electrode 5, in a direction along a longitudinal direction of the signal wiring electrode, had a somewhat narrower width at an extended portion, and were, respectively, 5 μm and 8 μm. In order to realize a larger opening fraction as possible, the common electrode 5 and the signal electrode 3 were overlapped somewhat (1 μm) through intermediary of the insulating film.

Accordingly, a black matrix structure 16 wherein light was shielded only in a direction along the scanning wiring electrode was adopted. In accordance with the above described features, a gap between the common electrode became 20 μm, the longitudinal length of the opening became 157 μm, and consequently, a large opening fraction, such as 44.0%, was obtained.

The number of picture elements was 320×160 with 320 signal wiring electrodes and 160 wiring electrodes.

A driving LSI was connected to the panel, as shown in FIG. 7, a vertical scanning circuit 20 and an image signal driving circuit 21 were connected to the TFT substrate, and the active matrix was driven by a scanning signal voltage, an image signal voltage and a timing signal supplied from a power source circuit and a controller 22.

In this embodiment, an insulating film 0.4 μm thick was formed with silicon nitride (SiN). As for the orienting film, a polyamide orienting film made from 4, 4'-diaminodiphenylether and pyromellitic acid dianhydride was used. The thickness of the orienting film was 0.1 μm, and accordingly, the total thickness of the insulating film and the orienting film was 0.5 μm.

Between the substrates, a nematic liquid crystal composition having a positive dielectric anisotropy $\Delta\in$ of 4.5 and birefringence $\Delta n$ of 0.072 (589 nm, 20° C.) was inserted.

The direction of the upper and the lower boundary planes were approximately parallel mutually, and formed an angle of 95 degrees ($\phi_{LC1}\phi_{LC2}=95°$) to the direction of the supplied electric field. A gap d was kept by holding dispersed spherical polymer beads between the substrates at a 4.5 μm interval under a liquid crystal filled condition. Therefore, $\Delta n \cdot d$ is 0.324 μm. The panel was held between two polarizers (made by Nitto Denko Co., G1220DU), the polarizing light transmitting axis of one polarizer was selected as approximately parallel to the rubbing direction, i.e. $\phi_{P1}=95°$, and the axis of the other polarizer was selected as perpendicular to the rubbing direction, i.e. $\phi_{P2}=5°$. Accordingly, normal closed characteristics were obtained.

Figure 10A:
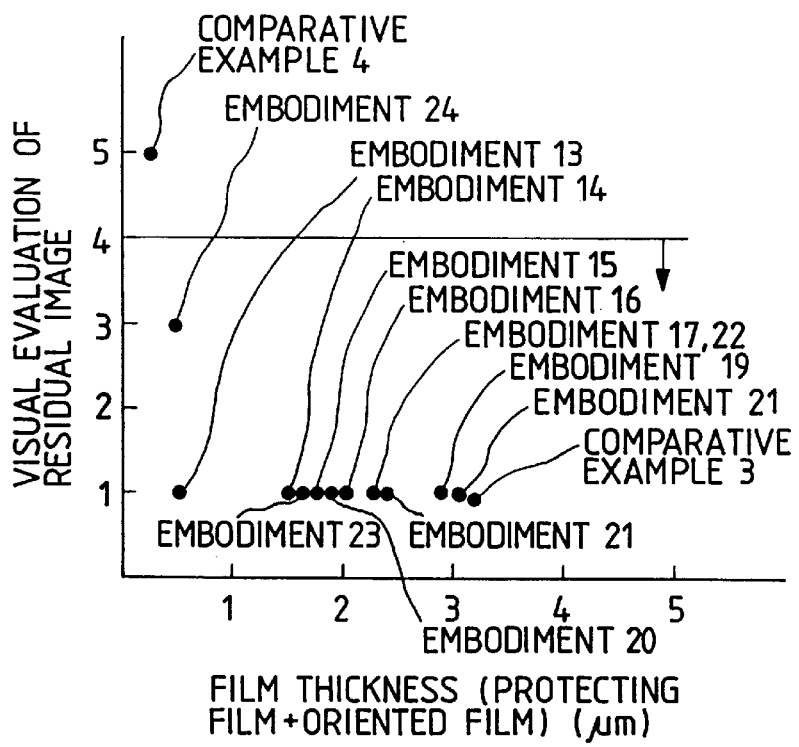
FIG. 10(a) is a graph indicating a relationship between a sum of film thickness of the insulating film and the orienting film, and results of residual image evaluation.
Figure 10B:
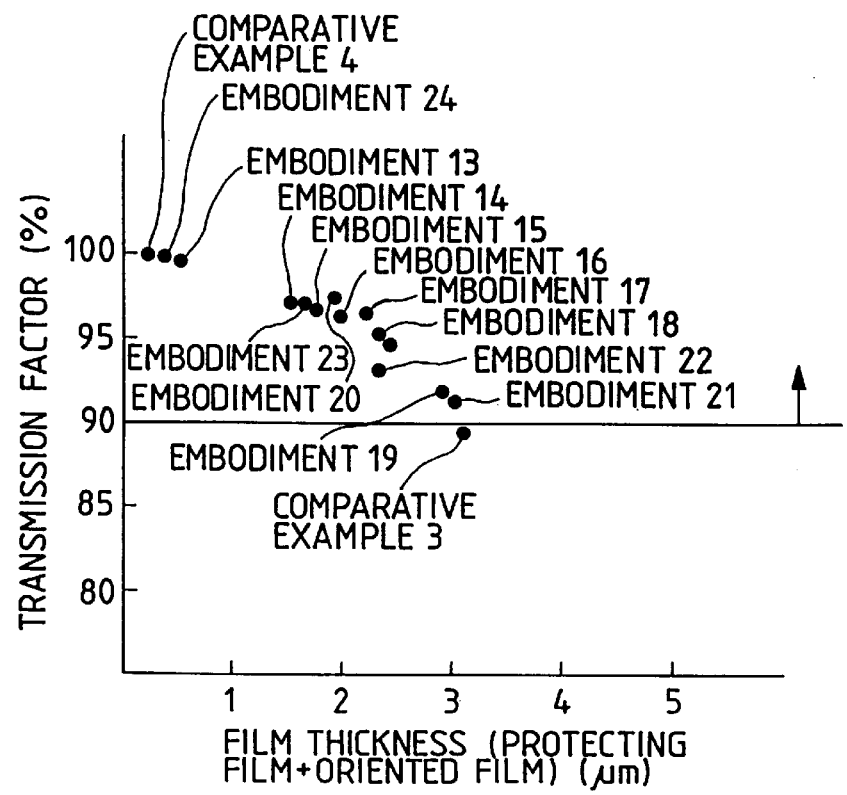
FIG. 10(b) is a graph indicating a relationship between a sum of film thickness of the insulating film and the orienting film, and transmission factor.

The residual image of the active matrix liquid crystal display device obtained in the above explained manner was evaluated as rank 1, as shown in FIG. 10(a), and no residual image was observed at all. Further, the transparency of the insulating film and the orienting film maintained a more than 90% transmission factor, as shown in FIG. 10(b). The transparency was evaluated by the transmission factor at 400 nm.

Embodiment 14

The composition of this embodiment is the same as embodiment 13 except for the following matters.

In this embodiment, silicon dioxide (SiO$_2$) was used for the insulating film, and its thickness was 1.2 μm. As for the orienting film, a polyamide orienting film made from 4, 4'-diaminodiphenylether and pyromellitic acid dianhydride was used. The thickness of the orienting film was 0.3 μm, and accordingly, the total thickness of the insulating film and the orienting film was 1.5 μm.

The residual image of the active matrix liquid crystal display device obtained in the above manner was evaluated as rank 1, as shown in FIG. 10(a), and no residual image was observed at all. Further, the transparency of the insulating film and the orienting film maintained a more than 90% transmission factor, as shown in FIG. 10(b).

Embodiment 15

The composition of this embodiment is the same as embodiment 13 except for the following matters.

In this embodiment, the orienting film had a double layer structure comprising inorganic silicon nitride (SiN) and organic epoxy resin. The thickness of the silicon nitride layer and the epoxy resin layer was 1.0 μm and 0.6 μm, respectively. Further, as for the orienting film, an orienting film composition RN-718 (made by Nissan Chemical Co.) was used, and its thickness was 0.2 μm. Accordingly, the total thickness of the insulating film and the orienting film was 1.8 μm.

The residual image of the active matrix liquid crystal display device obtained in the above manner was evaluated as rank 1, as shown in FIG. 10(a), and no residual image was observed at all. Further, the transparency of the insulating film and the orienting film maintained a more than 90% transmission factor, as shown in FIG. 10(b).

Embodiment 16

The composition of this embodiment is the same as embodiment 13 except for the following matters.

In this embodiment, the orienting film had a double layer structure comprising inorganic silicon nitride (SiN) and an organic epoxy resin. The thickness of the silicon nitride layer and the epoxy resin layer was 0.3 μm and 1.5 μm, respectively. Further, as for the orienting film, an orienting film composition RN-718 (made by Nissan Chemical Co.) was used, and its thickness was 0.2 μm. Accordingly, the total thickness of the insulating film and the orienting film was 2.0 μm.

The residual image of the active matrix liquid crystal display device obtained in the above manner was evaluated as rank 1, as shown in FIG. 10(a), and no residual image was observed at all. Further, transparency of the insulating film and the orienting film maintained a more than 90% transmission factor, as shown in FIG. 10(b).

Embodiment 17

The composition of this embodiment is the same as embodiment 13 except for the following matters.

In this embodiment, silicon dioxide (SiO$_2$) was used for the insulating film, and its thickness was 0.2 μm. As for the orienting film, a polyamide orienting film made from 4, 4'-diaminodiphenylether and pyromellitic acid dianhydride was used. The thickness of the orienting film was 2.0 μm, and accordingly, the total thickness of the insulating film and the orienting film was 2.2 μm.

The residual image of the active matrix liquid crystal display device obtained in the above manner was evaluated as rank 1, as shown in FIG. 10(a), and no residual image was observed at all. Further, the transparency of the insulating film and the orienting film maintained a more than 90% transmission factor, as shown in FIG. 10(b).

Embodiment 18

The composition of this embodiment is the same as embodiment 13 except for the following matters.

In this embodiment, an epoxy resin was used as the insulating film, and its thickness was 1.8 μm. As for the orienting film, a polyamide orienting film made from 2,2-bis[4-(p-aminophenoxy)phenylpropane and pyromellitic acid dianhydride was used, and its thickness was 0.5 μm. Accordingly, the total thickness of the insulating film and the orienting film was 2.3 μm.

The residual image of the active matrix liquid crystal display device obtained in the above manner was evaluated as rank 1, as shown in FIG. 10($a$), and no residual image was observed at all. Further, the transparency of the insulating film and the orienting film maintained a more than 90% transmission factor, as in FIG. 10($b$).

Embodiment 19

The composition of this embodiment is the same as embodiment 13 except for the following matters.

In this embodiment, the insulating film and the orienting film were made of the same material. That means, a polyamide orienting film made from 2, 2-bis [4-(p-aminophenoxy)phenylpropane and pyromellitic acid dianhydride, which has both the functions of an insulating film and an orienting film, as applied was 2.8 μm thick.

The residual image of the active matrix liquid crystal display device obtained in the above manner was evaluated as rank 1, as shown in FIG. 10($a$), and no residual image was observed at all. Further, transparency of the insulating film and the orienting film maintained a more than 90% transmission factor, as shown in FIG. 10($b$).

Embodiment 20

The composition of this embodiment is the same as embodiment 13 except for the following matters.

A color filter was formed in the insulating film. First, a silicon nitride (SiN) film was formed, and the color filter was provided on the silicon nitride film by printing. Further, an epoxy resin was applied in order to flatten the film surface. Subsequently, the orienting film was formed by applying an orienting film composition RN-718 (made by Nissan Chemical Co.).

The thickness of the silicon nitride layer and the epoxy resin layer was 0.3 μm and 1.5 μm, respectively. Further, the orienting film composition as applied was 0.2 μm thick.

The residual image of the active matrix liquid crystal display device obtained in the above manner was evaluated as rank 1, as shown in FIG. 10($a$), and no residual image was observed at all. Further, the transparency of the insulating film and the orienting film maintained a more than 90% transmission factor, as shown in FIG. 10($b$).

Embodiment 21

The composition of this embodiment is the same as embodiment 20 except for the following matters.

In order to make the orienting film surface abutting to the liquid crystal more flat, the epoxy resin layer was made 0.3 μm thick and the orienting film composition Rn-718 as applied was 0.7 μm thick. Accordingly, the flatness of the surface was improved, and a lapping treatment was performed more uniformly because of decreased steps at the surface. As a result, light leakage was eliminated.

The residual image of the active matrix liquid crystal display device obtained in the above manner was evaluated as rank 1, as shown in FIG. 10($a$), and no residual image was observed at all. Further, the contrast was increased over that of the embodiment 17.

Embodiment 22

The composition of this embodiment is the same as embodiment 20 except for the following matters.

The printability of the polyamide orienting film on the epoxy resin layer is not necessarily preferable. Therefore, inorganic silicon nitride (SiN) film 0.3 μm thick was formed on an epoxy resin layer 1.5 μm thick, which was applied for flattening of the color filter and as an insulating film. Therefore, the printability of the orienting film was improved. At that time, the orienting film composition RN-718 as applied was 0.1 μm thick.

The residual image of the active matrix liquid crystal display device obtained in the above manner was evaluated as rank 1, as shown in FIG. 10($a$), since no residual image was observed at all, and the contrast was increased over that of the embodiment 17, and the production yield was increased by improvement of the printability of the orienting film.

Embodiment 23

FIGS. 6($a$) to 6($c$) indicate a structure of an electrode for a picture element unit forming the twenty third embodiment of the present invention. In this embodiment, thin film transistors were not provided for the picture element units. A scanning signal electrode 13 and a signal electrode 3 were in different layers mutually. Each of the electrodes were connected respectively to a scanning circuit driver and an image signal circuit driver, and the matrix was driven in a simple time-shared manner.

The directions of the upper and the lower boundary planes were approximately parallel mutually, and formed an angle of 105 degrees ($\phi_{LC1}=\phi_{LC2}=105°$) to the direction of the supplied electric field (FIG. 2). A gap d was kept by holding dispersed spherical polymer beads between the substrates at a 4.2 μm interval under a liquid crystal filled condition. The panel was held between two polarizers (made by Nitto Denko Co., G1220DU), the polarizing light transmitting axis of one polarizer was selected as approximately parallel to a rubbing direction, i.e. ($\phi_{P1}=105°$, and the axis of the other polarizer was selected as perpendicular to the rubbing direction, i.e. $\phi_{P2}=15°$. Accordingly, normal closed characteristics were obtained.

As for the orienting film, a silicon nitride (SiN) film 0.7 μm thick was formed. And, an orienting film of RN-422 (made by Nissan Chemical Co.) was formed 0.9 μm thick on the insulating film.

The active matrix type liquid crystal display device as obtained above was evaluated as rank 1 in the evaluation of residual image, and no residual image was observed at all. Further, the transparency of the insulating film and the orienting film maintained a more than 90% transmission factor, as shown in FIG. 10($b$).

Embodiment 24

The composition of this embodiment is the same as embodiment 10 except for the following matters.

In this embodiment, a silicon nitride (SiN) film was used as for the insulating film, and its thickness was 0.3 μm. As for the orienting film, a polyamide orienting film made from 4, 4'-diaminodiphenylether and pyromellitic acid dianhydride was used. The thickness of the orienting film was 0.1 μm, and accordingly, the total thickness of the insulating film and the orienting film was 0.4 μm.

The residual image of the active matrix liquid crystal display device obtained in the above manner was evaluated as rank 3, as shown in FIG. 10($a$), and the residual image time was within five minutes. Further, transparency of the insulating film and the orienting film maintained a more than 90% transmission factor, as shown in FIG. 10($b$).

Organic films used in the present invention for the insulating film and the orienting film are not restricted by the organic polymers described in the embodiments. In addition to polyamide and epoxy group polymers, polyesters, polyurethanes, polyvinyl alcohols, polyamides, silicones, acrylates, olefin-sulfon group polymers, and the like can be used regardless of the photosensitivity. Further, surface treating agents, for instance, such as amino group silane coupling agents as γ-aminopropyl triethoxysilane, δ-aminopropyl methyldiethoxysilane, and N-β(aminoethyl) γ-aminopropyl trimethoxysilane, epoxy group silane coupling agents, titanate coupling agents, aluminum alcoholates, aluminum chelates, and zirconium chelates can be mixed or reacted with the organic polymers. But, the present invention is not restricted to the above examples.

Further, material for the inorganic film is not restricted only to silicon nitride and silicon dioxide, but also germanium nitride, germanium oxide, aluminum nitride, and aluminum oxide can be used. However, the present invention is not restricted to the above examples.

COMPARATIVE EXAMPLE 1

The composition of the embodiment used is the same as embodiment 2 except for the following matters.

The liquid crystal had a specific resistivity of $2.0 \times 10^{14}$ Ωcm and an average specific dielectric constant of 6.1. Silicon nitride (SiN) was used for the insulating film, and its specific resistivity was $6 \times 10^{15}$ Ωcm and its specific dielectric constant was 8. As for the orienting film, a polyamide orienting film made from 2, 2-bis[4-(p-aminophenoxy) phenylpropane and pyromellitic acid dianhydride was used, and its specific resistivity was $2.0 \times 10^{12}$ Ωcm and its average specific dielectric constant was 2.9.

Accordingly, respective products ($\in_r \rho$) of specific resistivity $\rho$ and specific dielectric constant $\in_r$ of the liquid crystal layer and the orienting film were less than $8 \times 10^{15}$ Ωcm, but the product ($\in_r \rho$) of specific resistivity $\rho$ and specific dielectric constant $\in_r$ of the insulating film was larger than $8 \times 10^{15}$ Ωcm.

The active matrix type liquid crystal display device as obtained above was evaluated as rank 5 in the evaluation of residual image, and the residual image time was beyond five minutes.

COMPARATIVE EXAMPLE 2

The composition of the embodiment used is the same as embodiment 2 except for the following matters.

The liquid crystal had a specific resistivity of $6.3 \times 10^{12}$ Ωcm and an average specific dielectric constant of 6.1. Silicon nitride (SiN) was used for the insulating film, and its specific resistivity was $2 \times 10^{15}$ Ωcm and its specific dielectric constant was 8. As for the orienting film, a polyamide orienting film made from 2, 2-bis[4-(p-aminophenoxy) phenylpropane and pyromellitic acid dianhydride was used, and its specific resistivity was $5.5 \times 10^{12}$ Ωcm and its average specific dielectric constant was 2.9.

Accordingly, respective products ($\in_r \rho$) of specific resistivity $\rho$ and specific dielectric constant $\in_r$ of the liquid crystal layer and the orienting film were less than $8 \times 10^{15}$ Ωcm, but product ($\in_r \rho$) of specific resistivity $\rho$ and specific dielectric constant $\in_r$ of the insulating film was larger than $8 \times 10^{15}$ Ωcm.

The active matrix type liquid crystal display device as obtained above was evaluated as rank 5 in the evaluation of residual image, and the residual image time was beyond five minutes.

COMPARATIVE EXAMPLE 3

The composition of the embodiment used is the same as embodiment 10 except for the following matters.

In the present example, silicon nitride (SiN) was used for the insulating film, and its thickness was 2.1 μm. As for the orienting film, a polyamide orienting film made from 4, 4'-diaminodiphenylether and pyromellitic acid dianhydride was used. The thickness of the orienting film was 1.0 μm, and accordingly, the total thickness of the insulating film and the orienting film was 3.1 μm.

The residual image of the active matrix liquid crystal display device obtained in the above manner was evaluated as rank 1, as shown in FIG. 10(a), but the transparency of the insulating film and the orienting film was less than 90% transmission factor, as shown in FIG. 10(b).

COMPARATIVE EXAMPLE

The composition of the embodiment used is the same as embodiment 10 except for the following matters.

In the present example, silicon nitride (SiN) was used as for the insulating film, and its thickness was 0.1 μm. As for the orienting film, RN-718 was used. The thickness of the orienting film was 0.1 μm, and accordingly, the total thickness of the insulating film and the orienting film was 0.2 μm.

The active matrix type liquid crystal display device as obtained above was evaluated as rank 5 in the evaluation of residual image, and the residual image time was beyond five minutes.

In accordance with the present invention, a liquid crystal display device having a high picture quality and in which a residual image is substantially eliminated can be obtained by making the brightness recovering time within five minutes after displaying same figure and/or character pattern for 30 minutes.

What is claimed is:

1. A liquid crystal display device having a plurality of switching elements, comprising:

a pair of substrates;

a liquid crystal layer interposed between said pair of substrates;

an electrode structure formed on one of said pair of substrates for generating an electric field having a component substantially in parallel with said one of said pair of substrates, said electrode structure including at least one common electrode and at least one pixel electrode; and an organic film formed on at least one of said at least one common electrode and said at least one pixel electrode, said organic film being both an insulating film and an orientation film;

wherein said organic film has a thickness of about 2.8 μm.

2. A liquid crystal display device according to claim 1, wherein said organic film has a transparency with a transmission factor of at least 90%.

3. A liquid crystal display device having a plurality of switching elements, comprising:

a pair of substrates;

a liquid crystal layer interposed between said pair of substrates;

an electrode structure formed on one of said pair of substrates for generating an electric field having a component substantially in parallel with said one of said pair of substrates, said electrode structure including at least one common electrode and at least one pixel electrode;

a gate insulating film formed on said at least one common electrode;

an insulation layer formed on said gate insulating film; and an orientation film formed on said insulation layer;
wherein a sum of thickness of said gate insulating film, said insulation layer and said orientation film is sufficient to enable display by said liquid crystal display device and is no greater than about 2.8 μm.

4. A liquid crystal display device as claimed in claim 3, wherein said gate insulating film is formed on said at least one common electrode without being formed on said at least one pixel electrode.

5. A liquid crystal display device according to claim 3, wherein said insulation layer formed on said gate insulating film is a passivation layer.

* * * * *